(12) United States Patent
Lacy et al.

(10) Patent No.: US 10,370,091 B2
(45) Date of Patent: Aug. 6, 2019

(54) AIRCRAFT ASSEMBLY WITH LOAD AND POSITION INDICATOR

(71) Applicant: GE AVIATION SYSTEMS LIMITED, Gloucestershire (GB)

(72) Inventors: Stuart John Lacy, Hampshire (GB); Indrakaji Gurung, Hampshire (GB)

(73) Assignee: GE AVIATION SYSTEMS LIMITED, Gloucestershire (GB)

( * ) Notice: Subject to any disclaimer, the term of this patent is extended or adjusted under 35 U.S.C. 154(b) by 50 days.

(21) Appl. No.: 14/936,579

(22) Filed: Nov. 9, 2015

(65) Prior Publication Data
US 2016/0137294 A1    May 19, 2016

(30) Foreign Application Priority Data

Nov. 14, 2014 (GB) .................................. 1420283.2

(51) Int. Cl.
| | |
|---|---|
| *G01L 5/00* | (2006.01) |
| *B64C 25/00* | (2006.01) |
| *B64C 25/10* | (2006.01) |
| *B64C 25/12* | (2006.01) |
| *B64D 45/00* | (2006.01) |

(52) U.S. Cl.
CPC ............ *B64C 25/10* (2013.01); *B64C 25/001* (2013.01); *B64C 25/12* (2013.01); *G01L 5/0052* (2013.01); *B64C 2025/125* (2013.01); *B64D 2045/008* (2013.01)

(58) Field of Classification Search
CPC ....... B64C 25/10; B64C 25/001; B64C 25/12; B64C 2025/125; G01L 5/0052; B64D 2045/008
USPC ...................................... 116/203; 244/102 R
See application file for complete search history.

(56) References Cited

U.S. PATENT DOCUMENTS

| | | | | |
|---|---|---|---|---|
| 2,552,666 A | * | 5/1951 | Cox .................... | B60C 23/0496 137/226 |
| 3,223,069 A | | 12/1965 | Albright | |
| 3,300,042 A | * | 1/1967 | Gordon ..................... | F16F 1/08 267/157 |
| 3,313,567 A | * | 4/1967 | Sturman ................. | B60R 19/28 188/268 |
| 3,623,449 A | * | 11/1971 | Knutson ............... | G01P 15/036 116/203 |

(Continued)

FOREIGN PATENT DOCUMENTS

| | | |
|---|---|---|
| EP | 2350590 A2 | 8/2011 |
| GB | 722837 A | 2/1955 |

(Continued)

OTHER PUBLICATIONS

Search Report and Combined Search and Examination Report from Intellectual Property Office (IPO) in connection with corresponding GB Application 1420283.2 dated May 15, 2015.

(Continued)

*Primary Examiner* — Justin Seo
*Assistant Examiner* — Tania C Courson
(74) *Attorney, Agent, or Firm* — McGarry Bair PC

(57) ABSTRACT

An aircraft assembly (10) having an indicator (20) configured to provide an indication of when an element of the aircraft assembly has received a predetermined load or traveled to a predetermined position.

24 Claims, 4 Drawing Sheets

(56) References Cited

U.S. PATENT DOCUMENTS

| | | | | |
|---|---|---|---|---|
| 3,625,178 A | * | 12/1971 | Prachar | B60R 21/33 116/203 |
| 3,752,462 A | * | 8/1973 | Wight, Jr. | F16F 1/3713 267/140 |
| 4,278,219 A | * | 7/1981 | Finance | G01P 15/036 116/203 |
| 4,765,602 A | * | 8/1988 | Roeseler | B29C 70/085 267/148 |
| 5,373,942 A | * | 12/1994 | Weder | A47G 7/085 206/423 |
| 5,628,069 A | | 5/1997 | Ebert | |
| 5,738,398 A | * | 4/1998 | Miano | A44B 18/00 24/442 |
| 5,857,217 A | * | 1/1999 | Hsueh | A44C 5/0007 2/170 |
| 5,927,646 A | | 7/1999 | Sandy et al. | |
| 6,116,251 A | * | 9/2000 | Stachowski | A45D 8/00 132/273 |
| 6,227,207 B1 | * | 5/2001 | Stachowski | A45D 8/00 132/273 |
| 6,712,286 B2 | * | 3/2004 | Baxter | A01M 31/008 239/36 |
| 7,140,946 B1 | * | 11/2006 | Marlin | A63H 33/00 446/486 |
| 7,274,310 B1 | * | 9/2007 | Nance | G08B 21/00 244/100 R |
| 7,347,019 B1 | * | 3/2008 | Shaw | F16F 1/025 40/607.01 |
| 8,156,887 B2 | * | 4/2012 | Tan | B64D 45/0005 116/281 |
| 8,482,909 B2 | * | 7/2013 | Douglas | A44C 5/0015 361/679.03 |
| 8,616,146 B2 | * | 12/2013 | Martin | B64C 25/001 116/203 |
| 8,769,742 B2 | * | 7/2014 | Thornton | A47G 9/062 5/420 |
| 8,800,382 B2 | * | 8/2014 | Bennett | B64C 25/00 73/802 |
| 8,935,988 B1 | * | 1/2015 | Perez | B60Q 7/00 116/63 P |
| 9,212,863 B1 | * | 12/2015 | Weinstock | A63H 33/18 |
| 9,272,792 B2 | * | 3/2016 | Hodgkinson | B64C 25/00 |
| 9,862,483 B2 | * | 1/2018 | Schmidt | B64C 25/10 |
| 2002/0050243 A1 | * | 5/2002 | Frink | B63C 11/26 116/210 |
| 2009/0139341 A1 | | 6/2009 | Cooper et al. | |
| 2010/0257923 A1 | | 10/2010 | Bennett et al. | |
| 2010/0288878 A1 | * | 11/2010 | Bennett | B64C 25/34 244/104 FP |
| 2011/0100289 A1 | * | 5/2011 | Birkin | B63C 9/04 116/210 |
| 2011/0214601 A1 | | 9/2011 | Martin et al. | |
| 2013/0056602 A1 | | 3/2013 | Zivku | |
| 2014/0026808 A1 | | 1/2014 | Hodgkinson et al. | |
| 2014/0262624 A1 | * | 9/2014 | Thornton | A47G 9/062 185/37 |
| 2015/0165338 A1 | * | 6/2015 | Choe | A63H 33/18 446/46 |
| 2018/0154078 A1 | * | 6/2018 | Mosebach | A61M 5/2033 |
| 2018/0169496 A1 | * | 6/2018 | Torres | A63B 69/002 |

FOREIGN PATENT DOCUMENTS

| | | |
|---|---|---|
| JP | 61168833 A | 7/1986 |
| JP | 0864197 A | 3/1996 |
| JP | 10281458 A | 10/1998 |
| JP | 11512366 A | 10/1999 |
| JP | 2001292513 A | 10/2001 |
| JP | 2003130284 A | 5/2003 |
| JP | 2011504829 A | 2/2011 |
| JP | 2013106914 A | 6/2013 |

OTHER PUBLICATIONS

Unofficial English Translation of Japanese Office Action issued in connection with corresponding JP Application No. 2015220831 dated Nov. 29, 2016.
Unofficial English Translation of Japanese Search report issued in connection with corresponding JP Application No. 2015220831 dated Dec. 29, 2016.
First Office Action and Search issued in connection with corresponding CN Application No. 201511029351.6 dated Apr. 27, 2017.
French Office Action issued in connection with corresponding FR Application No. 1560851 dated Jan. 22, 2018.

* cited by examiner

AIRCRAFT ASSEMBLY WITH LOAD AND POSITION INDICATOR

BACKGROUND OF THE INVENTION

Aircraft assemblies may require a visual indicator to determine if a load or position has been exceeded. For example, load and position indicators which are frangible have been used in a landing gear assembly which break in a plurality of pieces when the load or position exceeds the pre-determined value. When the frangible indicators break, the parts will become foreign objects and may cause Foreign Object Damage (FOD) to the aircraft. Also, once broken the frangible indicator may not be reset, instead the part must be replaced causing increased costs of maintenance. Another alternate example is an electronic system for measuring inertial or physical loads.

BRIEF DESCRIPTION OF THE INVENTION

An embodiment of the invention relates to an aircraft assembly having a movable element which moves in response to an applied load. The movable element is further coupled to a rehomeable indicator which mechanically moves between a non-home and home position in response to the moveable element moving to a predetermined position within a range of motion.

DETAILED DESCRIPTION OF THE INVENTION

Figure 1:
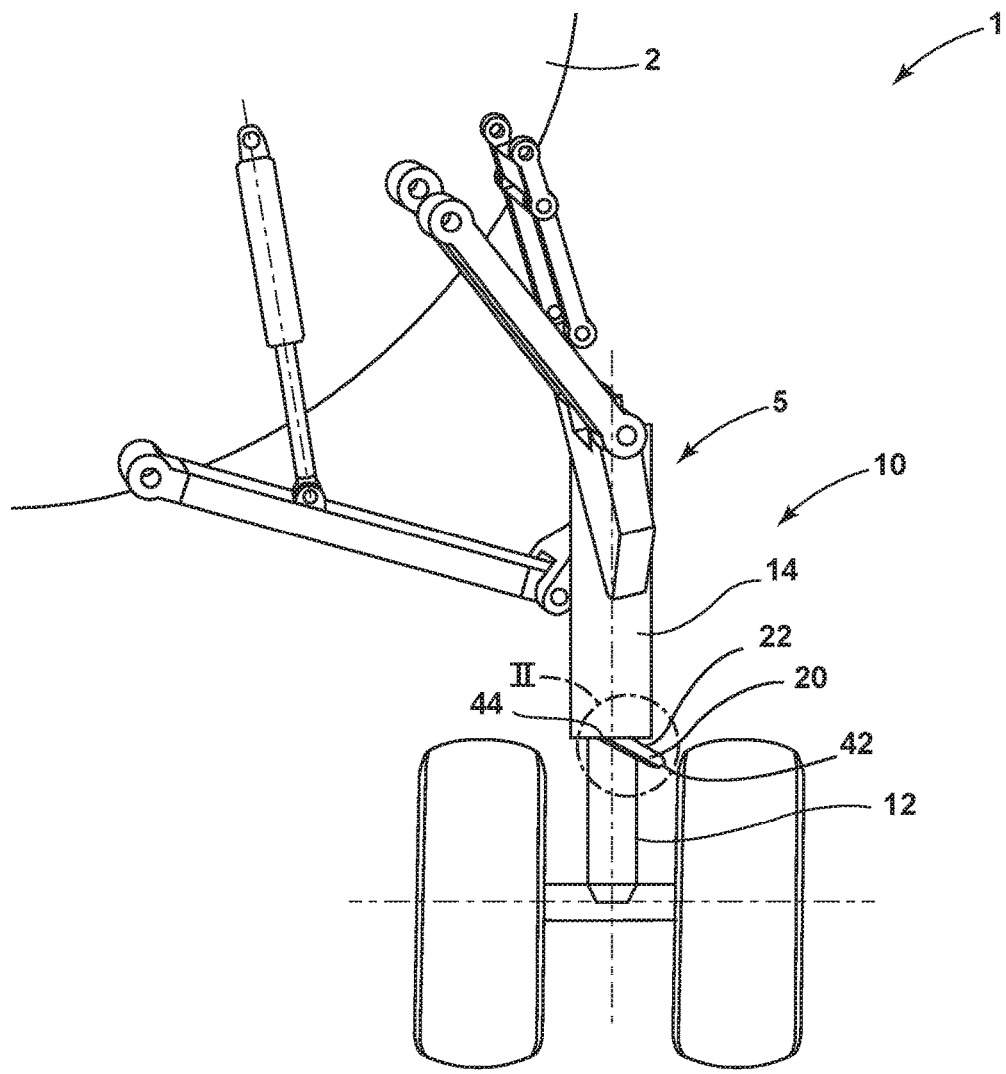
FIG. 1 is a schematic front view of a landing gear assembly of an aircraft having a rehomeable indicator.

FIG. 1 illustrates a first embodiment of an aircraft assembly 10, one example of which is a landing gear assembly. The aircraft assembly 10 comprises a moveable element 12, a stationary element 14, and a rehomeable load and position indicator 20. The moveable element 12 comprises a portion of the landing gear for an aircraft, one example of which is an actuator. The moveable element 12 is moveable through a range of motion in response to an applied load such as the actuator extending or retracting due to an internal pneumatic device or in reaction to a force of a landing.

The rehomeable indicator 20 is operably coupled to the moveable element 12 such that the rehomeable indicator 20 moves from a home position 22 to a non-home position 24 in response to the moveable element 12 moving to a pre-determined position within a range of motion. For example, the indicator 20 will start in the home position 22 when the actuator is retracted. When the actuator is in a predetermined normal range of extension, the indicator 20 will remain in the home position 22. When the actuator is extended beyond the predetermined range of extension, the indicator 20 is snapped into the non-home position 24. Once the actuator is retracted once again, the indicator 20 remains in the non-home position 24.

The predetermined position may correspond to an operational range limit in response to a predetermined load within the operational load limit. The operational load limit may be any predetermined limit wherein an inspection is necessitated if said load is exceeded. The load limit need not be the maximum limit load for the part.

While the aircraft assembly 10 is illustrated as a landing gear assembly, the environment for the rehomeable indicator 20 is not limited to a particular aircraft assembly. Other aircraft assemblies are contemplated such as transmission beams, engine mounts, struts, wings, empennage, primary fittings, or other principle structural elements. The aircraft assembly 10 is not limited to the aforementioned examples.

Figure 3:
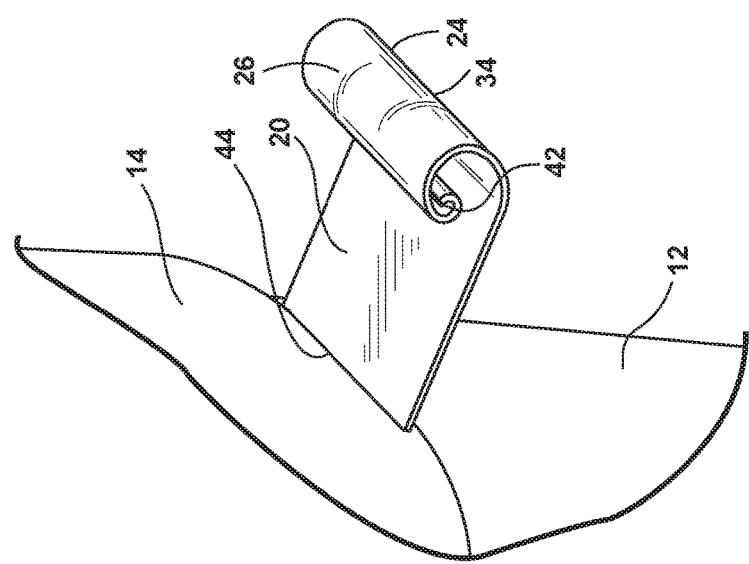
FIG. 3 is an enlarged partial view of the indicator in a non-home position on the landing gear assembly.
Figure 2:
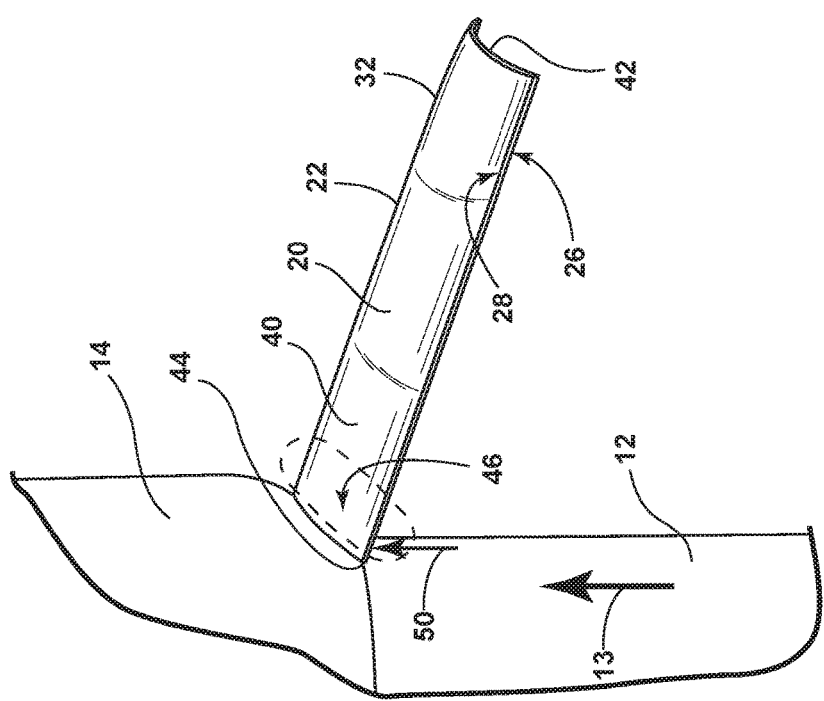
FIG. 2 is an enlarged partial perspective view of FIG. 1 of the indicator in a home position on the landing gear assembly.

Shown in FIGS. 2 and 3, the load and position indicator 20 can mechanically move between a home 22 and non-home position 24. In FIGS. 1 and 2, it is illustrated in the home position 22 where it is protruding perpendicularly to both the moveable element 12 and stationary element 14. The first end 42 of the indicator 20 is a free end while the second end 44 is coupled to the moveable element 12, in a cantilevered in position. The home position 22 corresponds to a position which visually signals that the aircraft assembly 10 to which the indicator 20 is coupled has not experienced any excessive force or displacement. The non-home position 24, shown in FIG. 3, visually signals that the aircraft assembly 10 has experienced an excessive force or displacement. The non-home position 24 is illustrated as curled or coiled, but may be of other positions as long as the non-home position 24 is obviously visually different than the home position 22. The rehomeable indicator 20 is non-frangible when moving between the home 22 and non-home position 24 and vice versa.

The term "non-frangible" as described herein is defined as not breaking, splitting, or coming apart. The part will remain intact throughout changes in position regardless of the number of times the position is changed.

The term "rehomeable" as described herein is defined as having the ability to be repositioned into another semi-permanent position. If no force is applied to the item, the item will stay in the current position.

The indicator 20 comprises a concave side 26 and a convex side 28. The indicator 20 comprises a bistable spring band 40 having a first stable condition 34 corresponding to the non-home position 24 and a second stable condition 32 corresponding to a home position 22. The bistable spring band 40 is configured to change between the first 34 and second 32 conditions in response to the application of a predetermined force 50, not shown. The predetermined force 50 corresponds to a predetermined load acting on the moveable element 12. The bistable spring band 40 has one portion 46 located within the path of movement of the moveable element 12 such that the bistable spring band 40 moves between the second 32 and first 34 conditions when the moveable element 12 contacts the one portion 46. A second end 44 is operably coupled to the moveable element 12. The bistable spring band 40 comprises opposing first 42 and second 44 ends, and the one portion 46 lies between the second 44 and first 42 ends.

The indicator 20 is made of a thin rectangular material that is slightly curved, forming the concave side 26 and opposing convex side 28. If the force or displacement is applied to the convex side 28, the indicator 20 will not move to the non-home position 24. If the force or displacement is applied to the concave side 26, the indicator will move to the non-home position 24.

The indicator 20 in the first embodiment is made of metal and may have a fabric or plastic covering but it may be any material which can repeatably move from one stable position to another, visually different, stable position. The indicator 20 may comprise layers of different materials or be of a uniform material.

FIG. 3 illustrates an enlarged view of the indicator 20 in the non-home position 24. The first end 42 is curled and visually indicates that a load or position has been exceeded. The indicator 20 is rehomeable and thus can be reset to the home position by the user. The indicator 20 is manually moveable from the non-home 24 to the home position 22 and is repeatable, resettable between the non-home 24 and home positions 22 without failing. The indicator 20 can be moved from the home position 22 to the non-home position 24 by a force or displacement acting on the indicator 20 directly or indirectly through the aircraft assembly 10 to which the indicator 20 is coupled. Only a user can manually move the indicator 20 back to the home position 22 once the indicator 20 is in the non-home position 24.

Figure 4:
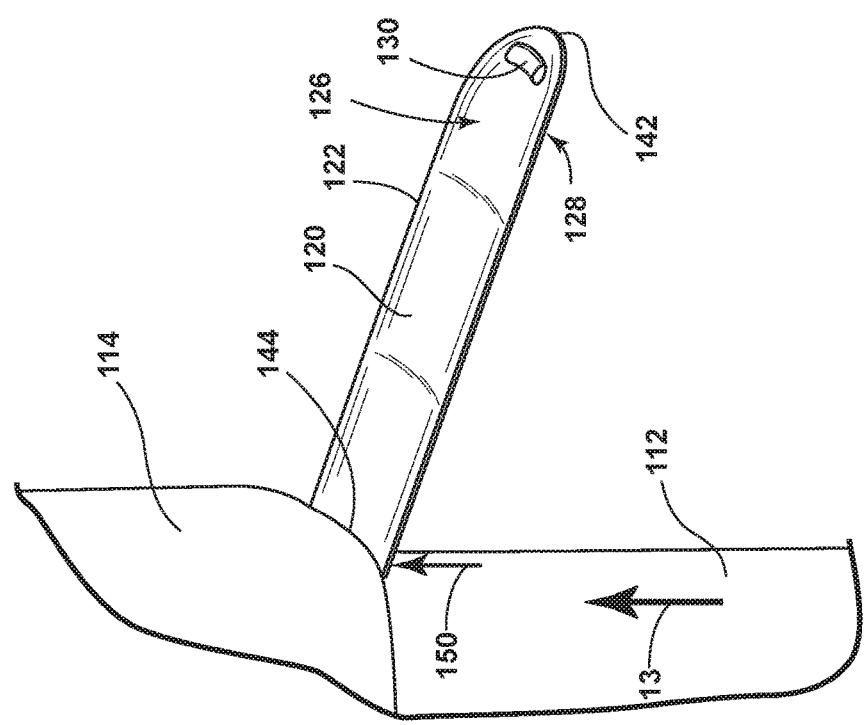
FIG. 4 is a second embodiment of the indicator in the home position.

FIG. 4 illustrates a second embodiment of an indicator 120 in the home position 122. The second embodiment is similar to the first embodiment, with the primary difference being the second embodiment comprises a mass 130 at the first end 142. The mass can be tuned to the desired inertial load range due to acceleration or deceleration by adjusting the weight and having a heavier tip at end 142. An alternate embodiment may have increased thickness at the first end 142 instead of a separately added mass 130. For the most part, like parts between the two embodiments will be identified with like numerals, with the numerals of the second embodiment being increased by 100.

Figure 5:
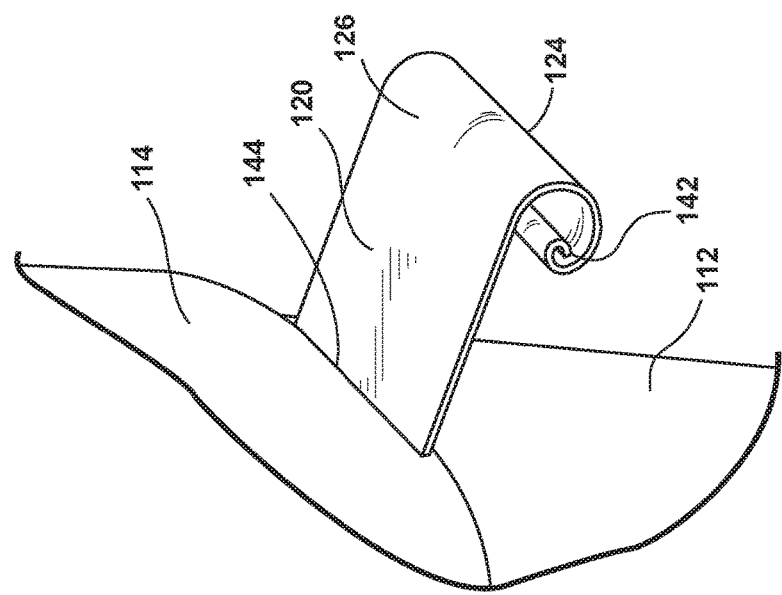
FIG. 5 is a second embodiment of the indicator in the non-home position.

FIG. 5 illustrates the second embodiment of the indicator 120 in a non-home position 124 which acts in the same manner as aforementioned in FIG. 3. The first end 142 is in the curled position after an inertial load exceeds the predetermined range. The added thickness or mass 130 will not prevent the indicator 120 from moving to the non-home position 124 and curling but facilitate the changing of position via an inertial load instead of necessitating a physical, applied force.

Figure 6:
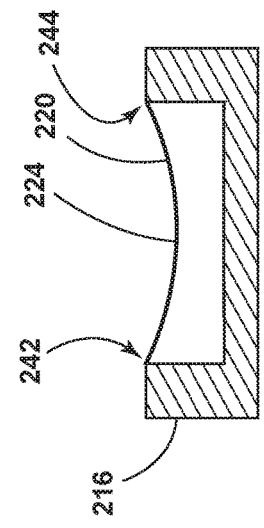
FIG. 6 is a third embodiment of the indicator in the home position.
Figure 7:
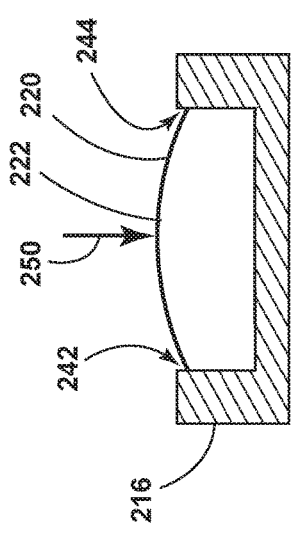
FIG. 7 is a third embodiment of the indicator in the non-home position.

FIG. 6 illustrates a third embodiment of an indicator 220 in the home position 222. The indicator 220 is a long strip of material, of any applicable cross section e.g. flat, round, square, held at each end 242 and 244 in a configuration where it is bowed upwards. The indicator 220 is illustrated as being surrounded by a support element 216 on three sides with the indicator 220 spanning the distance between two sides of the support element 216. A force 250 may be applied to the indicator 220 by direct contact, inertial force, or indirectly through the aircraft assembly 210 to which the indicator 220 is coupled. The material and shape can be any which will allow the indicator 220 to move from the home position 222 to the non-home position 224 and remain in the non-home position 224 until the user manually changes the position back to the home position 222. FIG. 7 illustrates the third embodiment of an indicator 220 in the non-home position 224 in a bowed downwards position after the force 250 has been applied.

Figure 8:
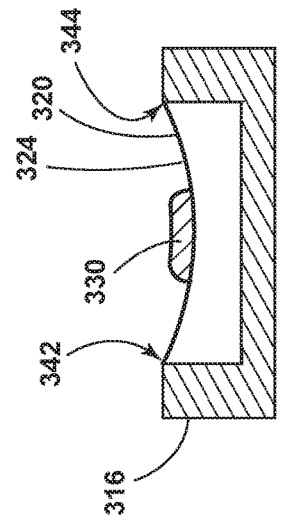
FIG. 8 is a fourth embodiment of the indicator in the home position.

FIG. 8 illustrates a fourth embodiment of an indicator 320 in the home position. The fourth embodiment is similar to the third embodiment, with the primary difference being the fourth embodiment comprises a mass 330 at the center. The mass can be tuned to the desired inertial load range due to acceleration by having a heavier section. An alternate embodiment may have increased thickness at the center instead of an added mass 330. For the most part, like parts between the two embodiments will be identified with like numerals, with the numerals of the fourth embodiment being increased by 100.

Figure 9:
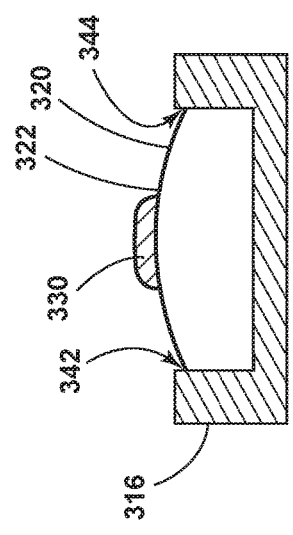
FIG. 9 is a fourth embodiment of the indicator in the non-home position.

FIG. 9 illustrates the indicator 320 in the non-home position, similar to the aforementioned in FIG. 7 in a bowed down position, after an inertial force has been applied.

Regarding FIGS. 1-5, the first and second embodiments of the indicator 20,120 respectively, protrude horizontally from the moveable element 12, 112. In alternate embodiments, the indicator 20, 120 may be vertically oriented or disposed inside a moveable element 12, 112. When a physical load, inertial load, or position is exceeded, the indicator 20, 120 is snapped into the non-home position 24, 124. The force applied on the concave side 26, 126 cause the indicator 20, 120 to curl under the convex side 28 so the concave side 26 become the outer side due to the shape and designed thickness. The thickness of material can be made to correspond to the operational load range so as to not snap to the non-home position 24 when too light of a force is applied. The force which snaps the indicator 20 to the non-home position will differ based on the implementation of the invention.

When the indicator 20, 120 is in the non-home position 24, 124, this alerts a user to inspect the area for damage caused by the exceeded load or displacement e.g. a hard landing. A hard landing causes a high deceleration which can be detrimental to a landing gear assembly. If an indicator 20, 120 is on each landing gear assembly, the indicators 20, 120 work independently thus allowing a user to quickly see if there was an asymmetric hard landing. When the inspection of the area is complete a user may uncurl the indicator 20, 120 in order to reset to the home position 22, 122. In this manner the indicator 20, 120 may be triggered and reset as many times as needed.

There are at least three methods to activate the indicator 20, 120 to snap from the home position 22, 122 to the non-home position 24, 124. One, is if a physical force 50, 150 is applied directly or indirectly against any part of the concave side 26, 126 of the indicator 20, 120. The second is if an inertial load is applied either directly or indirectly to the indicator 20,120 on the concave side 26, 126. The mass 130 or thickened section will react the inertial load which will result in the snapping of the indicator 120 into the non-home position. The inertial force is typically indirectly applied to the indicator 120 when the entire aircraft assembly 100 or individual part of the aircraft assembly 100 like the moveable element 112 experiences an application of a high force, e.g. the jarring force of a hard landing. The third is if a position of a part is exceeded. For example, if the actuator is over extended. This will push the indicator 20, 120 from the home position 22, 122 into the non-home position 24, 124.

Regarding FIGS. 6-9, the third and fourth embodiments of the indicator 220, 320 respectively also react to any of the at least three methods aforementioned. Both ends 242, 342 and 244, 344 are fixed and the center moves between the home position 222, 322 and the non-home position 224, 324 instead of curling as illustrated in the first and second embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An aircraft assembly comprising:
a moveable element movable through a range of motion and comprising a portion of a landing gear for an aircraft; and
a rehomeable indicator mechanically movable between a non-home position and a home position, wherein the rehomeable indicator comprises a bistable spring band having a first stable condition corresponding to the non-home position and a second stable condition corresponding to the home position,
wherein the rehomeable indicator is operably coupled with the moveable element such that the rehomeable indicator moves from the home position to the non-home position in response to the moveable element moving to a predetermined position within the range of motion.

2. The aircraft assembly of claim 1, wherein the predetermined position corresponds to an operational range limit.

3. The aircraft assembly of claim 1, wherein the predetermined position corresponds to a position of the moveable element in response to a predetermined load.

4. The aircraft assembly of claim 3, wherein the predetermined load comprises an operational load limit.

5. The aircraft assembly of claim 1, wherein the bistable spring band has one portion location within a path of movement of the moveable element such that the bistable spring band moves between the second stable condition and first stable condition when the moveable element contacts the one portion.

6. The aircraft assembly of claim 5, wherein the one portion comprises one end of the bistable spring band.

7. The aircraft assembly of claim 6, wherein the bistable spring band has a second end operably coupled to the moveable element.

8. The aircraft assembly of claim 5, wherein the bistable spring band comprises opposing first and second ends, and the one portion lies between the first and second ends.

9. The aircraft assembly of claim 1, wherein the bistable spring band is configured to change between the first stable condition and second stable condition in response to the application of a predetermined force.

10. The aircraft assembly of claim 9, wherein the predetermined force corresponds to a predetermined load acting on the moveable element.

11. The aircraft assembly of claim 10, wherein the predetermined load corresponds to an operational load limit.

12. The aircraft assembly of claim 11, wherein the operational load limit corresponds to an inertial load resulting from an aircraft landing.

13. The aircraft assembly of claim 1, wherein the rehomeable indicator is non-frangible when moving between the home and non-home positions.

14. The aircraft assembly of claim 1, wherein the rehomeable indicator is manually moveable from the non-home position to the home position.

15. The aircraft assembly of claim 1, wherein the rehomeable indicator is repeatably, resettable between the non-home and home positions without failing.

16. An aircraft comprising:
a mounting surface; and
an aircraft assembly coupled to the mounting surface, comprising:
a moveable element movable through a range of motion; and
a rehomeable indicator mechanically movable between a non-home position and a home position, the rehomeable indicator comprising a bistable spring band having a first stable condition corresponding to the non-home position and a second stable condition corresponding to the home position, wherein a free end of the rehomeable indicator is in a curled position when the rehomeable indicator is in the non-home position;
wherein the rehomeable indicator is operably coupled with the moveable element such that the rehomeable indicator moves from the home position to the non-home position in response to the moveable element moving to a predetermined position within the range of motion.

17. The aircraft of claim 16, wherein the predetermined position corresponds to an operational range limit.

18. The aircraft of claim 16, wherein the predetermined position corresponds to a position of the moveable element in response to a predetermined load.

19. The aircraft of claim 18, wherein the predetermined load comprises an operational load limit.

20. The aircraft of claim 16, wherein the bistable spring band has one portion location within a path of movement of the moveable element such that the bistable spring band moves between the second stable condition and first stable condition when the moveable element contacts the one portion.

21. The aircraft of claim 20, wherein the one portion comprises one end of the bistable spring band.

22. The aircraft of claim 21, wherein the bistable spring band has a second end operably coupled to the moveable element.

23. The aircraft of claim 20, wherein the bistable spring band comprises opposing first and second ends, and the one portion lies between the first and second ends.

24. An aircraft assembly comprising:
a moveable element movable through a range of motion and comprising a portion of a landing gear for an aircraft; and
a rehomeable indicator mechanically movable between a non-home position and a home position, the rehomeable indicator comprising a bistable spring band having a first stable condition corresponding to the non-home position and a second stable condition corresponding to the home position;
wherein the rehomeable indicator is operably coupled with the moveable element such that the rehomeable indicator moves from the home position to the non-home position in response to the moveable element moving to a predetermined position within the range of motion, and wherein the rehomeable indicator is non-frangible when moving between the home and non-home positions.

\* \* \* \* \*